US005480187A

United States Patent [19]
Binning

[11] Patent Number: 5,480,187
[45] Date of Patent: Jan. 2, 1996

[54] NEWSPAPER BUNDLE CART

[75] Inventor: Ronald L. Binning, Hampton, Va.

[73] Assignee: IDAB Incorporated, Hialeah, Fla.

[21] Appl. No.: 73,033

[22] Filed: Jun. 8, 1993

[51] Int. Cl.⁶ .................................................... B62B 3/04
[52] U.S. Cl. .......................... 280/79.2; 280/79.3; 296/50
[58] Field of Search ............................ 280/33.995, 651, 280/659, 79.11, 79.2, 79.3, 47.34, 47.35; 108/53.1, 53.3, 53.5, 54.1, 51.1; 211/169, 126, 186; 296/22, 50; 312/250, 295

[56] References Cited

U.S. PATENT DOCUMENTS

| D. 287,177 | 12/1986 | Spicer | D34/21 |
|---|---|---|---|
| D. 333,895 | 3/1993 | Niemeyer | D34/24 |
| 2,045,837 | 6/1936 | Creber | 16/144 |
| 2,200,692 | 5/1940 | Fairley | 16/163 |
| 2,819,908 | 1/1958 | Jackson et al. | 280/79.2 |
| 2,905,480 | 9/1959 | Giovannelli | 280/659 |
| 3,313,378 | 4/1967 | Freeman et al. | 280/79.2 |
| 3,582,102 | 6/1971 | Bewick | 280/33.995 |
| 3,861,768 | 1/1975 | Wilson | 280/33.995 |
| 3,893,686 | 7/1975 | Morgan | 280/651 |
| 4,648,613 | 3/1987 | Hennessy | 280/79.2 |
| 5,078,415 | 1/1992 | Goral | 280/79.2 |
| 5,096,648 | 3/1992 | Johnson et al. | 264/245 |
| 5,108,120 | 4/1992 | Jarmusz et al. | 280/47.2 |

OTHER PUBLICATIONS

Cannon Equipment Co. brochure, "Carts & Automated Loaders Cut Newspaper Distribution Costs," 3 pages (undated).
Piper Casepro brochure, "Newspaper Cart System," 2 pages (undated).

Primary Examiner—Richard M. Camby
Attorney, Agent, or Firm—Finnegan, Henderson, Farabow, Garrett & Dunner

[57] ABSTRACT

A cart for handling a load includes a generally horizontal support for supporting the load, vertical rear and side walls for laterally confining the load, and at least one door for laterally confining the front of the load. A hinge permits the door to pivot about a vertical pivot axis and a latch having a plurality of latch positions holds the door in one of the latch positions for laterally confining the front of the load.

32 Claims, 5 Drawing Sheets

NEWSPAPER BUNDLE CART

BACKGROUND OF THE INVENTION

1. Field of the Invention

This invention relates generally to carts for supporting and containing vertically stacked units, and particularly relates to carts for supporting and containing newspaper bundles.

2. Description of the Related Art

The circulation of daily newspapers requires that every operation from printing of the newspapers to distribution be performed quickly and efficiently. Accordingly, loading and shipping newspapers to distributors must be performed quickly and efficiently without damaging the newspapers.

The loading operation stacks single newspapers after printing to form a bundle. The bundles, which may be secured with string for lateral support, are carried by a conveyor to a loading station and loaded onto a cart or other transport vehicle.

To increase the efficiency of the system, the conveyor contains apparatus for arranging bundles into an array and each array of bundles is loaded onto a cart as a layer, rather than individually loading each bundle. For example, the array may consist of a 2×2 or 2×3 array of bundles.

The handling of bundles becomes increasingly important as the bundle size and number of bundle layers increase. Each newspaper bundle is approximately eleven inches in width and fourteen inches in length with an average height ranging from three to fifteen inches and a maximum height of approximately eighteen inches. At this height, the newspaper bundles weigh approximately fifty pounds.

Inserting fliers or magazines in newspapers causes the bundles to be fatter in the middle. As a result, the bundles are unstable lengthwise and must be stabilized in the cart to prevent the bundles from falling out of the cart during and after loading.

Several types of carts have been used for handling newspaper bundles. The carts generally have a rectangular horizontal support with three vertical walls. The newspaper bundles are loaded onto the horizontal support through a open side of the cart. The carts typically included straps for retaining the bundles. After loading, an operator had to manually fasten the straps to the walls in an attempt to enclose the bundles in the cart. In addition to requiring substantial operator effort, the straps were generally ineffective in that the irregularly shaped bundles often fell out of the cart between the straps.

Other carts used doors, or a combination of doors and straps, which were opened by an operator during the loading process and closed in order to retain the bundles during transport. The operator closed and latched the doors together or latched the doors to the horizontal support. Latching the doors was sometimes difficult, thus increasing operator time and reducing system efficiency. The doors, which extended from the cart during loading, also impeded operator movement about the cart.

Another type of cart included a horizontal support, three vertical walls, and netting which covered the open side of the cart. However, in order to load this cart, the bundles had to be loaded from the top of the cart rather than the side, which was much more difficult, and thus more expensive than side loading.

SUMMARY OF THE INVENTION

Accordingly, it is an object of the present invention to provide a newspaper bundle cart which increases the efficiency of the loading process.

It is another object of the present invention to provide a newspaper bundle cart which reduces operator involvement during loading.

It is another object of the present invention to provide a newspaper bundle cart which can stably and reliably retain newspaper bundles in the cart.

It is another object of the present invention to provide a newspaper bundle cart which does not impede operator movement about the cart during loading.

It is a further object of the present invention to provide a newspaper bundle cart which can be used in a simple and inexpensive loading process.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a generally horizontal support for supporting the load, generally vertical rear and side walls for laterally confining the rear and sides of the load, at least one generally vertical door for laterally confining the front of the load, a hinge for permitting the door to pivot about a generally vertical pivot axis proximate to one of the side walls, and a latch having a plurality of latch positions for holding the door in any of the latch positions and laterally confining the front of the load.

In another aspect, the invention includes a generally horizontal support for supporting the load, generally vertical rear and side walls for laterally confining the rear and sides of the load, at least one generally vertical door for laterally confining the front of the load, and a hinge for permitting the door to pivot about a generally vertical pivot axis proximate to one of the side walls, wherein one of the side walls has an opening for nesting the door in one of the side walls.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DESCRIPTION OF THE PREFERRED EMBODIMENT

Figure 1:
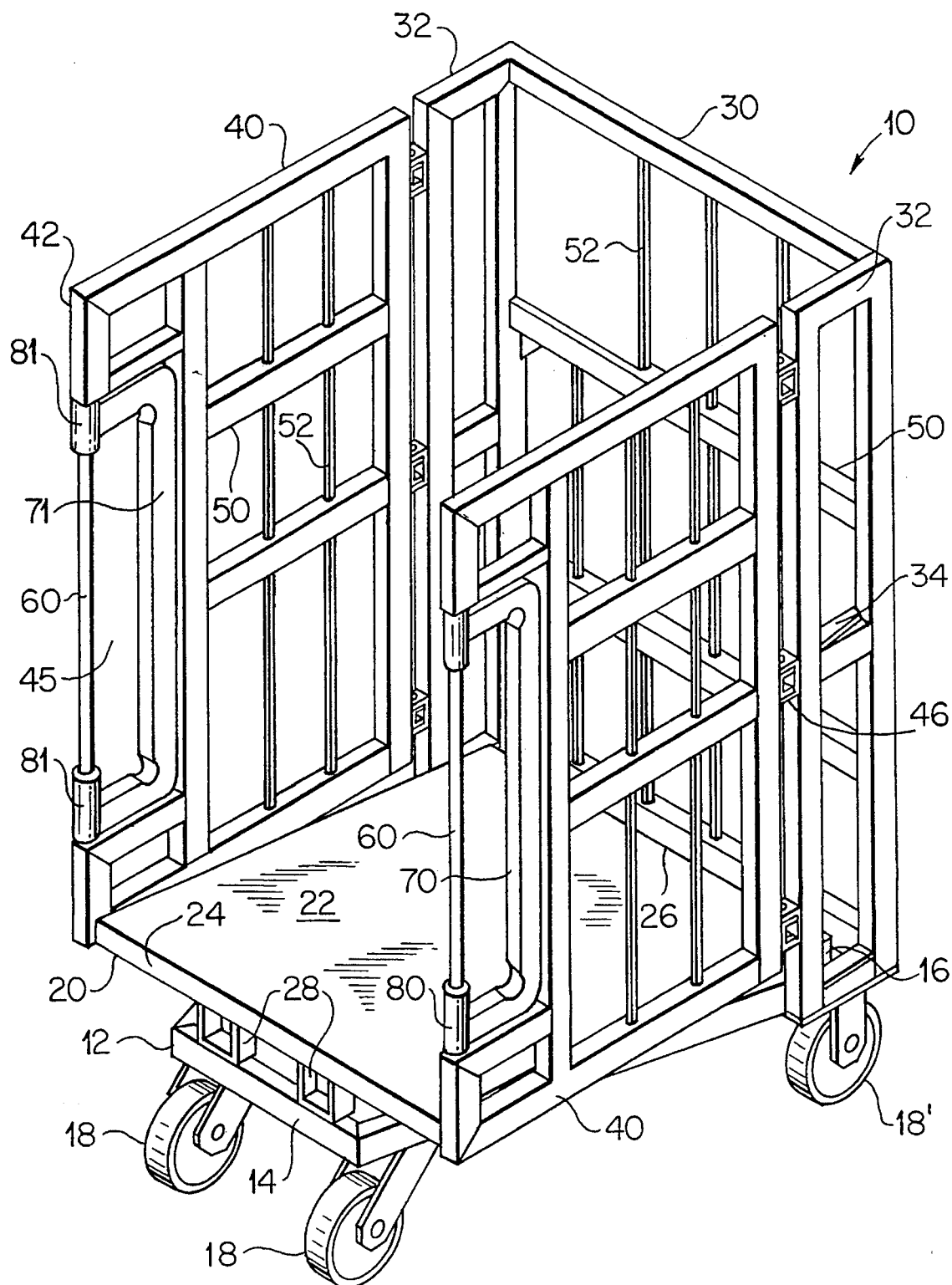
FIG. 1 is a perspective view of a newspaper bundle cart incorporating the present invention.

Reference will now be made in detail to the present preferred embodiment of the invention, an example of which is illustrated in the accompanying drawings. Wherever possible, the same reference characters will be used throughout the drawings to refer to the same or like parts.

As embodied herein, the newspaper bundle cart 10, as shown in FIG. 1, includes a generally horizontal support 20 supported by a horizontal galvanized steel frame 12. The horizontal support 20 is a rectangular galvanized steel sheet having front and rear ends 24, 26 and a loading surface 22 for receiving and supporting a load of bundles. As shown in FIG. 1, the galvanized steel sheet is solid; however, the horizontal support may also be a mesh sheet or consist of closely spaced galvanized steel rods. As discussed in more detail later, the rear end 26 of the support 20 is pivotally attached to the rear of the horizontal frame 12 to allow folding of the cart when not in use.

Figure 2:
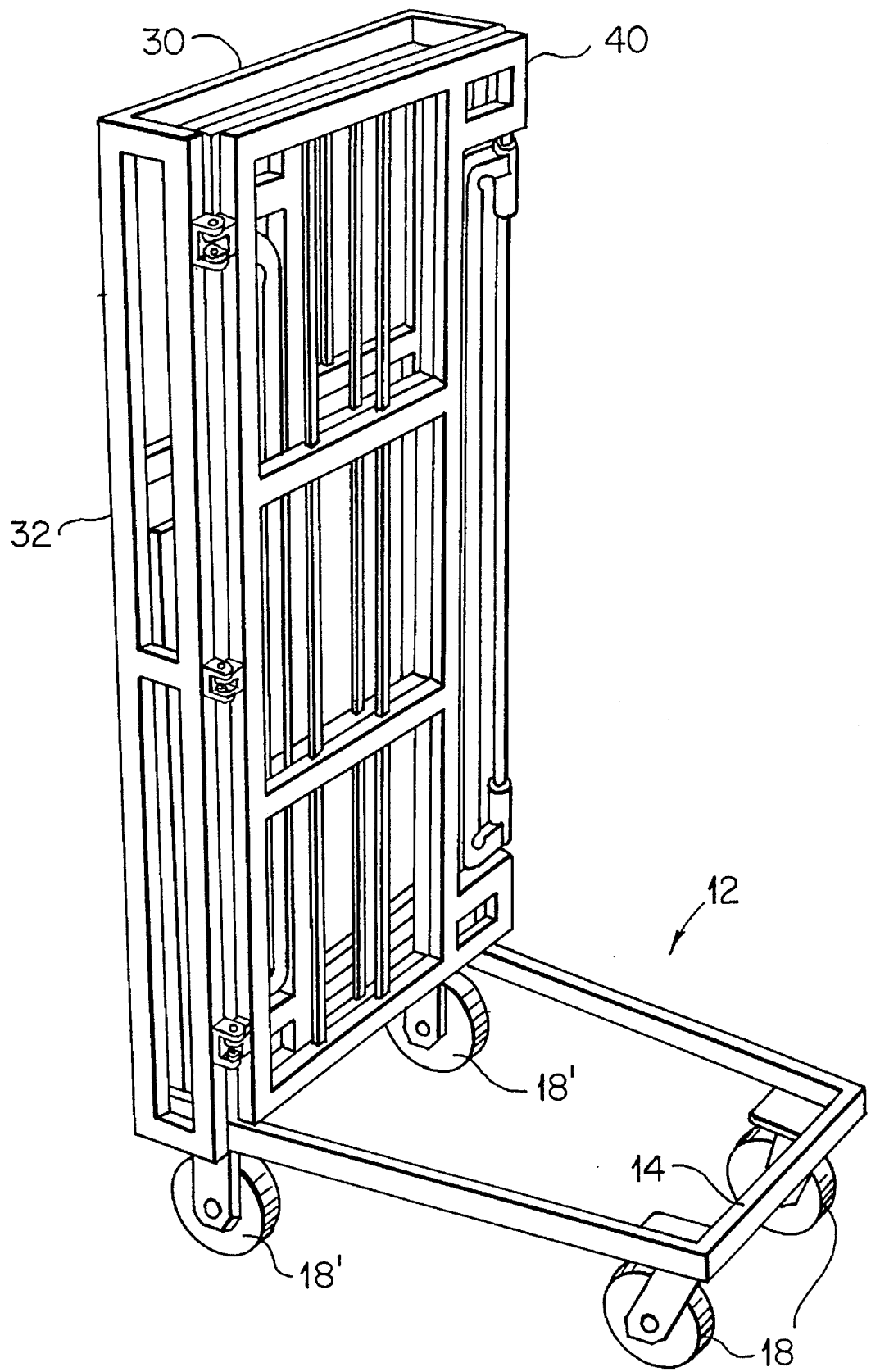
FIG. 2 is a perspective view of a newspaper bundle cart incorporating the present invention and shown in a folded condition.

As shown in FIGS. 1 and 2, the horizontal frame 12 is shaped like a trapezoid, having a rear end 16 wider than a front end 14. Four casters 18, 18' are attached below the corners of the frame. Although not evident from the drawings, casters 18' have a higher floor clearance than casters 18, thereby elevating the rear end 16 of the frame relative to the front end 14. The shape and back-to-front inclination of the frame 12 allow nesting of plural carts in a manner similar to carts found in supermarkets.

Vertical walls extend upwardly from the rear and sides of the horizontal support 20 to define an inner load space for laterally confining the load. A rear vertical wall 30 is mounted to and extends upwardly from the rear end 16 of the frame 12. The rear vertical wall 30 includes vertical side portions 32 extending perpendicularly from lateral ends of the rear vertical wall 30 and positioned above the rear casters 18'.

Vertical side walls 40, having front and rear vertical edges, 42, 44, are pivotally attached to the vertical side portions 32 of the rear wall 30 with hinges 46. The side walls 40 can pivot from a load position, as shown in FIG. 1, to a folded position, as shown in FIG. 2. The side walls 40 are held in the load position with latch members (not shown) attached to the horizontal support 20.

The vertical walls are constructed of intersecting horizontal and vertical galvanized steel bars 50, 52 for retaining the bundles in the cart. Alternatively, solid side and rear walls may be used; however, the use of horizontal and vertical bars is preferable since they reduce the total weight of the cart while still providing lateral constraint and support for the bundles. The walls may also be made of aluminum or plastic to further reduce the weight of the cart.

As shown in FIG. 1, the front vertical edge 42 of each side wall which is adjacent the front end 24 of the horizontal support includes a cylindrical portion 60. Galvanized steel doors 70, 71 having a generally U-shaped configuration are rotatably mounted to each of the cylindrical portions 60 with hinges 80, 81. The vertical edges 42 define a pivot axis about which the doors pivot.

Figure 3:
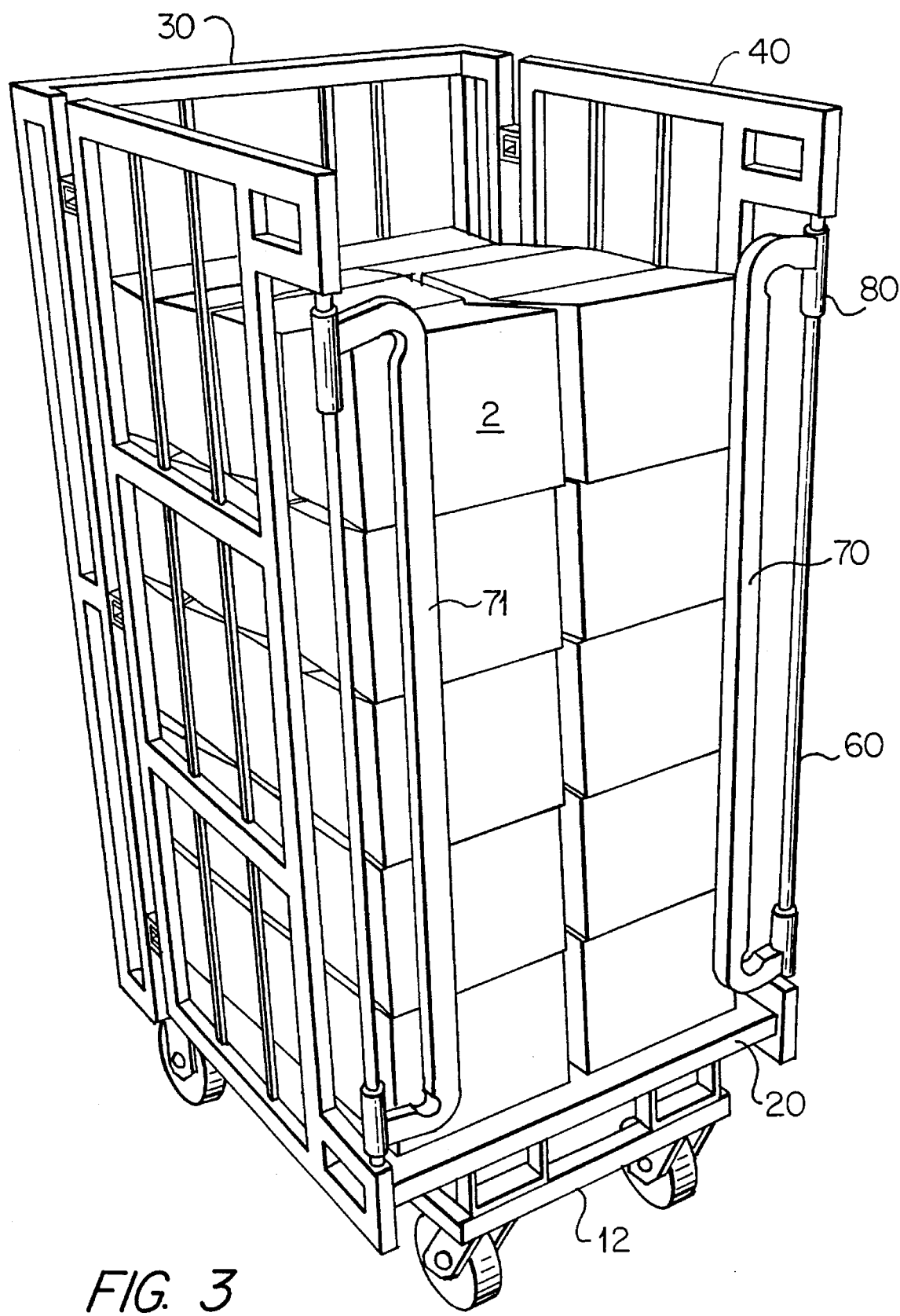
FIG. 3 is a perspective view of a newspaper bundle cart incorporating the present invention and shown supporting a plurality of stacked bundles.

The side walls 40 are configured to define an opening 45 for allowing the doors to rotate 360° about the front vertical edges 42 of the side walls. The height and width of the doors are preferably chosen to effectively confine the stack of bundles 2 loaded on the cart, as shown in FIG. 3. The width of each door is preferably one-quarter of the width of the front end of the support. Therefore, the doors, when closed, extend approximately one-half of the width of the front end of the support. Although two doors are preferably used, a larger single door may also be used.

As shown in FIG. 2, the cart can be folded to allow for the nesting of carts, thereby reducing the space necessary for storing carts not in use. When folding the cart, the doors 70, 71 are positioned in the opening 45 of the side walls 40. The support 20, which is pivotally attached to the rear end of the frame, is pivoted upwardly and latched into a folded position with a gravity latch 34 or any other well-known latching mechanism. The side walls 40 are then folded over the folded support 20 by pivoting them inwardly about the vertical side portions 32 of the rear wall 30.

Although a foldable cart suitable for nesting is described as the preferred embodiment, it is not critical to the invention that the cart be foldable. For example, the horizontal support could serve as the frame with the vertical walls directly attached to the horizontal support. Alternatively, the horizontal support and side walls could be pivotally attached to the rear wall and the side walls provided with horizontal plates for supporting the support in a load position.

Figure 4:
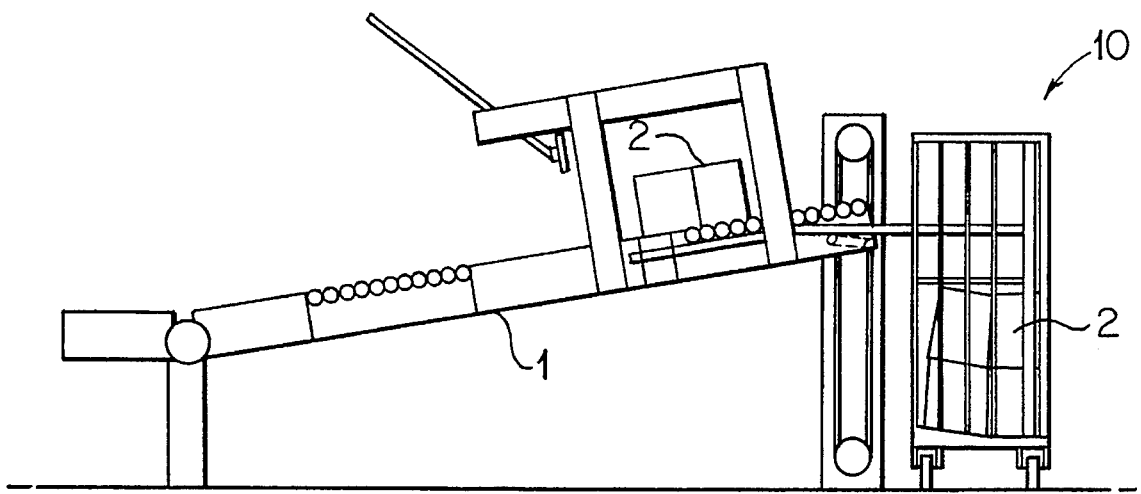
FIG. 4 is a side view of a newspaper bundle cart of the present invention at a loading station adjacent a conveyor.

The loading of the cart is described with reference to FIG. 4 which shows the front end of the cart adjacent a conveyor 1. The doors are latched in a nested position within an opening in the side walls to prevent the doors from impeding operator movement about the cart during loading.

The conveyor 1 carries an array of bundles 2 which are consecutively placed on a loading surface 22 of the cart 10 in a stacked fashion until the cart is fully loaded, as shown in FIG. 3. The side walls laterally support the longitudinal sides (folded edges) of the newspaper bundles while the rear wall and doors, when closed, support the transverse sides of the bundles. The fully loaded cart is then removed from the load position and replaced with an empty cart.

To facilitate retention of the load in the cart during loading, the front end 24 of the horizontal support 20 is preferably inclined relative to the rear end 26 to urge the bundles against the rear wall 30. As shown in FIG. 1, this is accomplished by mounting spacers 28 to the bottom front end 24 of the support 20. The spacers 28 rest on the horizontal frame 12 when the support 20 is unfolded to elevate the front end 24 relative to the rear end 26.

Once loading is complete, the doors must be closed to prevent the bundles from falling out of the cart. The cart of the present invention includes latches which position the doors proximate to the load to stably retain the load in the cart while minimizing operator involvement.

As shown in FIG. 1, hinges 80, 81 pivotally attach the doors 70, 71 to the cylindrical portion 60 of the side walls 40. Each hinge is a tubular member mounted to the ends of the doors and circumscribing the cylindrical portion 60 of the side walls.

Figure 5:
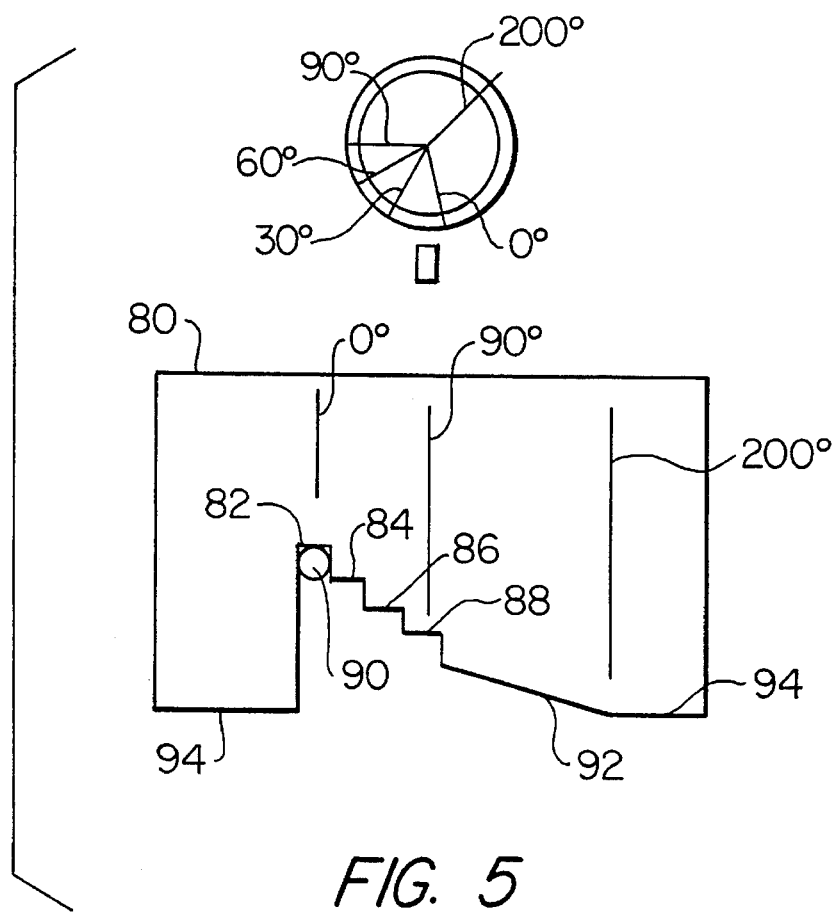
FIG. 5 is a side unwrapped view of a door hinge utilized in a newspaper bundle cart of the present invention.
Figure 6:
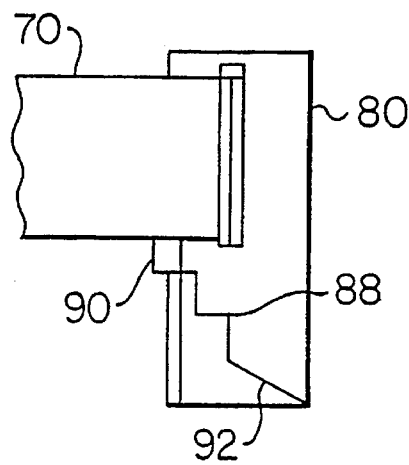
FIG. 6 is a side view of the door hinge of FIG. 5.

As shown in FIGS. 5 and 6, the cylindrical wall of each tubular member also functions as an element of a latch. The cylindrical wall acts as a cylindrical cam which contains a sloped edge portion 92. Notches 82, 84, 86, 88 are machined in a step-wise fashion on the sloped edge portion 92 of the cylindrical wall of each tubular member, each notch representing a latch position for the door.

Cam followers are mounted on the cylindrical portions of the side walls and follow the surfaces of the cylindrical cams to hold the doors in any selected one of the latch positions. Each cam follower is preferably a roll pin 90, which follows the lower edge of the tubular member to provide vertical support for its door.

Cooperation between the cylindrical cam and follower controls the rotation and positioning of the doors relative to the load and is described in detail with reference to FIGS. 5, 6 and 7(a)–(d). FIG. 5 shows the cylindrical wall of each tubular member as it would appear unwrapped. FIGS. 7(a)–(d) illustrate the rotation of the doors as the follower engages the lower edge of the cylindrical cam. Right door 70 rotates in a clockwise direction, when viewing the cart from above, while left door 71 rotates in a counterclockwise direction.

Figures 7A, 7B:
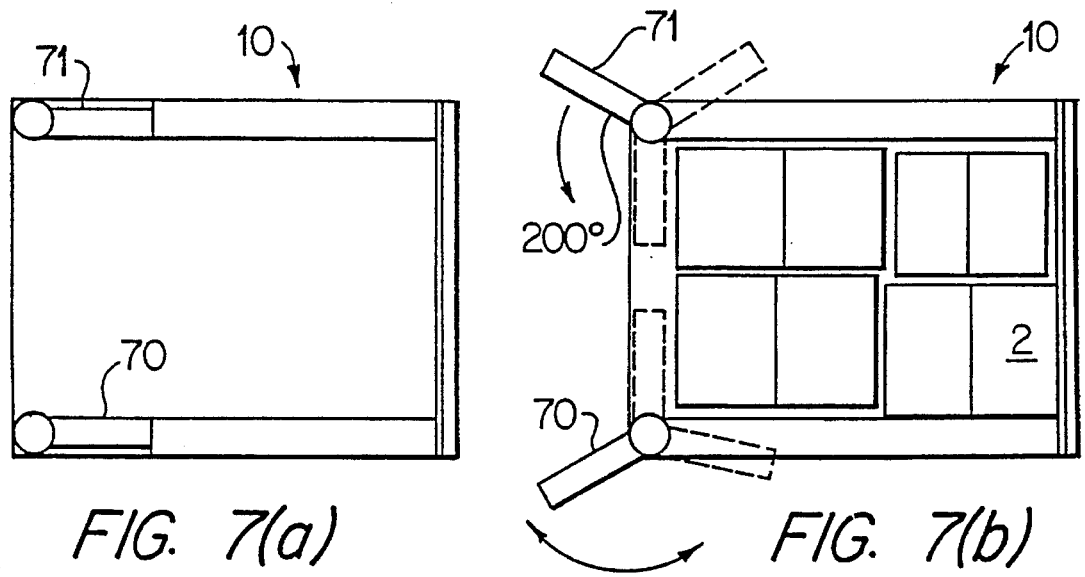
FIGS. 7(a)–(d) are plan views of a newspaper bundle cart of the present invention showing the doors in various orientations.

As shown in FIG. 7(a), the latches hold the doors 70, 71 in the openings of the side walls, which is referred to as the 0° or nested position. In the nested position, roll pin 90 is engaged in notch 82, as shown in FIG. 5. To remove each door from the nested position, the door is lifted and slightly rotated outwardly from the inner load space until roll pin engages flat edge portion 94 of the tubular member. As shown in FIG. 7(b), each door is freely rotatable while roll pin 90 contacts flat edge 94.

When the operator rotates the doors to the 200° position (measured counterclockwise from the nested position for the right door 70 or clockwise for the left door 71), roll pin 90 will engage sloped edge portion 92 of the tubular member, and gravity will cause the doors to rotate toward the front end of the horizontal support without further assistance by the operator. The sloped edge portion will also prevent the door from rotating in the opposite direction (i.e., in a counterclockwise direction for the right door 70).

Figures 7C, 7D:
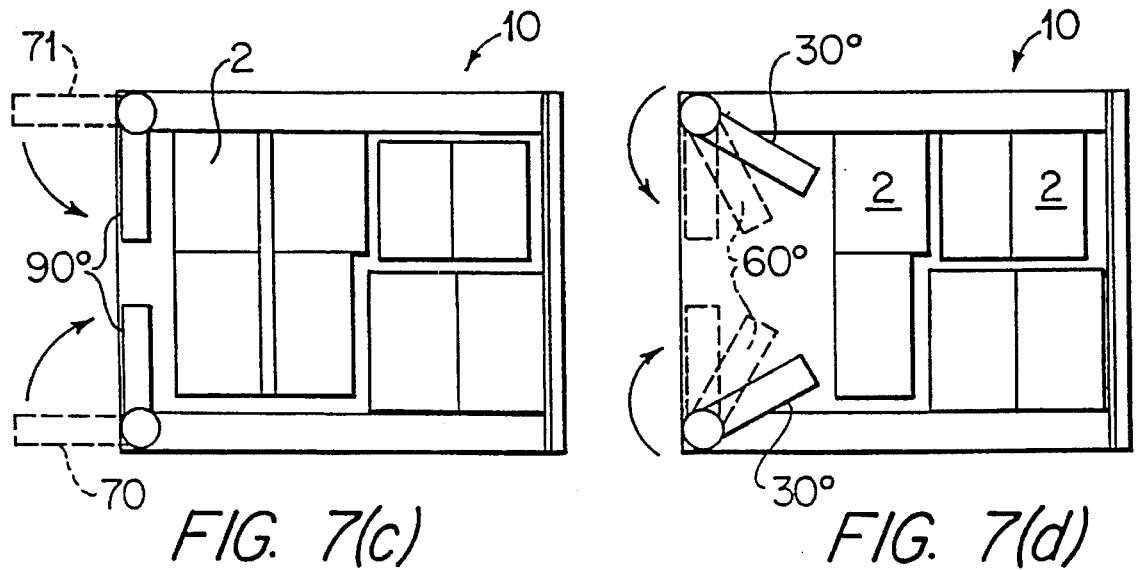

While engaging the sloped portion, roll pin 90 will first engage notch 88 which positions the doors parallel to the front end of the horizontal support and perpendicular to the side walls (i.e., 90° position), as shown in FIG. 7(c). If the load is placed near the front end, the load will prevent further rotation of the doors and the latch (cylindrical cam and roll pin) will hold the doors at the 90° latch position. If not, the doors will continue rotating and the roll pin will engage notch 86. If the doors contact the load while the roll pin is in notch 86, the doors will be held in a latch position 60° relative to the nested position, as shown in FIG. 7(d).

If the doors do not contact the load while in notch 86, the doors will continue to rotate and the roll pin will engage notch 84. If the doors contact the load while the roll pin is in notch 84, the doors will be held in a latch position 30° relative to the nested position, also shown in FIG. 7(d).

If there is no load positioned on the support, the doors will rotate under the force of gravity until roll pin 90 engages notch 82 which will hold the door in the nested position and prevent further rotation unless the doors are lifted by the operator.

The tubular member can be constructed to include more or less notches for positioning the doors at various locations. The 30°, 60°, and 90° positions are exemplary of conditions typically occurring in practice.

As shown in FIG. 6, the retaining doors are preferably mounted to the tubular members so that the retaining doors will cover the notched edge and the roll pin when in the nested position, thus preventing the roll pin from catching on anything, such as an operator's clothing, during operation of the cart.

As illustrated by the above description, the hinge and latch are constructed and arranged such that the doors automatically rotate to the one of the latch positions which positions the doors in closest closure relation to the load, thereby reducing operator involvement. The doors, when latched in position close to the load, confine the load in the cart and prevent bundles from falling out of the cart after loading.

The latch is not limited to a notched sloped surface engaging a roll pin. For example, the roll pin may also be a machined tube which mates with the notched edge of the tubular member. It is also not necessary to integrate the hinge and cylindrical cam of the latch into one element (i.e., tubular member) of the cart.

It will be apparent to those skilled in the art that modifications and variations can be made in the newspaper bundle cart of the present invention and in construction of this newspaper bundle cart without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A cart for supporting and containing a load, comprising:
   a support for supporting the load;
   generally vertical rear and side walls for laterally confining the rear and sides of the load;
   at least one generally vertical door for laterally confining the front of the load;
   a hinge for permitting the door to pivot about a generally vertical pivot axis proximate to one of the side walls; and
   a latch having a plurality of latch positions for holding the door in any of the latch positions and laterally confining the front of the load, the latch including a cylindrical cam with a sloped portion for urging the door to rotate in a predetermined direction, and a plurality of progressive notches for establishing the latch positions and a follower for engaging the sloped portion and notches.

2. The cart of claim 1, wherein the latch is positioned proximate to the pivot axis.

3. The cart of claim 1, including means for urging the door to the latch position in which the door is closest to the load to minimize any lateral movement of the load.

4. The cart of claim 2, including means for urging the door to the latch position in which the door is closest to the load to minimize any lateral movement of the load.

5. The cart of claim 1, wherein one of the notches positions the door in a position perpendicular to the side wall.

6. The cart of claim 1, wherein the follower engages a succession of the notches in the sloped portion as the door pivots toward the load, the one notch proximate the follower when the door contacts the load establishing the closed position and preventing rotation of the door in a direction opposite the predetermined direction of rotation.

7. The cart of claim 1, wherein the generally horizontal support is movable between a generally horizontal loading position for supporting the load and a generally vertical folded position.

8. The cart of claim 1, wherein the side walls are pivotally attached to the rear wall and are movable between open positions for laterally confining the load and folded positions substantially parallel to the rear wall.

9. The cart of claim 1, wherein said at least one door includes first and second doors, the hinge for the first door being proximate to one of the side walls and the hinge for the second door being proximate to the other side wall.

10. The cart of claim 9, wherein the latch for the one door being positioned proximate to the pivot axis for said one door and the latch for the second door being positioned proximate to the pivot axis for the other door.

11. The cart of claim 9, wherein the width of each door in the horizontal direction is approximately one-quarter of the width of the front of the support in the horizontal direction.

12. The cart of claim 1, wherein the front end of the generally horizontal support is at a higher elevation than the rear end.

13. A cart for supporting and containing a load, comprising:

a support for supporting the load;

generally vertical rear and side walls for laterally confining the rear and sides of the load;

at least one generally vertical door for laterally confining the front of the load;

a hinge for permitting the door to pivot about a generally vertical pivot axis proximate to one of the side walls;

a latch having a plurality of latch positions for holding the door in any of the latch positions and laterally confining the front of the load; and the side wall proximate to the generally vertical pivot axis including an opening for allowing the door to rotate 360° about the pivot axis.

14. The cart of claim 13, including means for urging the door to rotate in a predetermined direction toward the load.

15. The cart of claim 13, wherein one of the latch positions is a nested latch position for latching the door in a nested position within the opening in the wall.

16. The cart of claim 15, including means for urging the door to rotate to the nested latch position when the cart is empty.

17. The cart of claim 13, wherein the latch includes a cylindrical cam with a sloped portion for urging the door to rotate in a predetermined direction, and a plurality of progressive notches for establishing the latch positions and a follower for engaging the sloped portion and notches.

18. The cart of claim 17, wherein one of the notches positions the door in the latched nested position.

19. The cart of claim 17, wherein one of the notches positions the door in a position perpendicular to the side wall.

20. The cart of claim 17, wherein one of the notches positions the door above the horizontal support in a position approximately 30° relative to the nested position.

21. The cart of claim 17, wherein one of the notches positions the door above the horizontal support in a position approximately 60° relative to the nested position.

22. The cart of claim 15, wherein the latch prevents rotation of the door in any direction when in the nested position.

23. The cart of claim 18, wherein the latch prevents rotation of the door in any direction when in the nested position.

24. A cart for supporting and containing a load, comprising:

a support for supporting the load;

generally vertical rear and side Walls for laterally confining the rear and sides of the load;

at least one generally vertical door for laterally confining the front of the load;

a hinge for permitting the door to pivot about a generally vertical pivot axis proximate to one of the side walls; and said one of the side walls having an opening for nesting the door in said one of the side walls.

25. The cart of claim 24, including a latch for latching the door in the opening in the side wall.

26. The cart of claim 24, wherein said at least one door includes first and second doors, the hinge for the first door being proximate to one of the side walls and the hinge for the second door being proximate to the other side wall.

27. The cart of claim 26, wherein the latch for the one door being positioned proximate to the pivot axis for said one door and the latch for the second door being positioned proximate to the pivot axis for the other door.

28. The cart of claim 1, including wheels for permitting the cart to roll.

29. The cart of claim 24, including wheels for permitting the cart to roll.

30. A cart for supporting and containing a load, comprising:

a support for supporting the load;

generally vertical rear and side walls for laterally confining the rear and sides of the load;

at least one generally vertical door for laterally confining the front of the load;

a hinge for permitting the door to pivot about a generally vertical pivot axis proximate to one of the side walls; and a latch having a plurality of latch positions for holding the door in any of the latch positions and laterally confining the front of the load, including at least one latch position for latching the door over the support at an angle less than 90° relative to the side walls.

31. The cart of claim 30, including a plurality of latch positions for latching the door over the support at an angle less than 90° relative to the side walls.

32. The cart of claim 30, including a latch position for latching the door substantially perpendicular to one of the side walls.

* * * * *